(12) United States Patent
Racovolis et al.

(10) Patent No.: US 7,536,635 B2
(45) Date of Patent: May 19, 2009

(54) ENABLING USERS TO REDACT PORTIONS OF A DOCUMENT

(75) Inventors: Dean Anthony Racovolis, Redmond, WA (US); Douglas J. Turner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 11/114,918

(22) Filed: Apr. 25, 2005

(65) Prior Publication Data

US 2006/0242558 A1 Oct. 26, 2006

(51) Int. Cl.
*G06F 15/00* (2006.01)

(52) U.S. Cl. .................. 715/229; 715/272; 715/271; 715/253; 713/157; 707/203

(58) Field of Classification Search ............. 715/511, 715/531, 530, 539, 540; 713/167; 707/203
See application file for complete search history.

(56) References Cited

U.S. PATENT DOCUMENTS

| 5,903,646 | A | * | 5/1999 | Rackman | 705/51 |
| 6,195,677 | B1 | * | 2/2001 | Utsumi | 709/201 |
| 2001/0018739 | A1 | * | 8/2001 | Anderson et al. | 713/176 |
| 2002/0083079 | A1 | * | 6/2002 | Meier et al. | 707/104.1 |
| 2004/0044894 | A1 | * | 3/2004 | Lofgren et al. | 713/176 |
| 2004/0088313 | A1 | * | 5/2004 | Torres | 707/101 |
| 2006/0184522 | A1 | * | 8/2006 | McFarland et al. | 707/5 |
| 2006/0206462 | A1 | * | 9/2006 | Barber | 707/3 |

OTHER PUBLICATIONS

Votsch, Victor, Appligent White Paper: The Case for Content Security, 2004, Appligent, Inc., pp. 1-8.*
Redax, Appligent Redax 3.6 plug-in for Adobe Acrobat, Apr. 4, 2004, Appligent, Full and Lite Versions, pp. 1-7.*

* cited by examiner

*Primary Examiner*—Doug Hutton
*Assistant Examiner*—Nathan Hillery
(74) *Attorney, Agent, or Firm*—Wolf, Greenfield & Sacks, P.C.

(57) ABSTRACT

Systems and methods for redacting portions of a document resulting in one or more versions of the document that show to readers the portions of the document that have been redacted. At least one of these one or more versions may have the content of the redacted portions encrypted and/or actually removed and replaced with a sort of filler (e.g., to resemble a blacked out portion of a paper copy). At least one other version may show to users the actual content that has been redacted. This latter version may be retained for users privy to the content (i.e., information) of the redacted portions, so that they know what content was redacted, whereas versions with the content removed or encrypted may be provided to those not privy to the content.

14 Claims, 5 Drawing Sheets

ENABLING USERS TO REDACT PORTIONS OF A DOCUMENT

BACKGROUND

Information in a document is often shared between multiple persons. Sometimes it is desirable that certain persons do not have access to all of the information in the document. For example, a first party to a law suit may be required by law to produce for another party information that is contained in a document. This document also may contain other information (e.g., privileged information) that the first party is not required to produce, and does not want the other party to see. Further, in organizations such as the military, business entities or government entities, information in a document may be classified for some members of the organization, but not others.

Typically, to prevent certain persons from reviewing certain information in a document, portions of the document are redacted. Portions of a document may be redacted by printing the document, and blacking out the portions using a black marker. Alternatively, a copy of the document (initially including the same content) is created (e.g. using a word processing application), and portions are "redacted" by simply deleting them.

Blacking out portions of paper copies is messy, time consuming and prone to human error between copies, while copying the document and deleting portions results in a document that does not visually indicate to the reader the portions that have been "redacted."

SUMMARY

Described herein are systems and methods for redacting portions of a document, resulting in one or more versions of the document that show (i.e., visually indicate) to readers the portions of the document that have been redacted. The one or more resulting versions may have the content of the redacted portions encrypted and/or actually removed and visually represented with a sort of filler (e.g., resembling a blacked out portion of a paper copy). Further, at least one version may show to users the actual content that has been redacted from other versions. This latter version may be retained for users privy to the content (i.e., information) of the redacted portions, so that they know what content was redacted, whereas versions with the content removed or encrypted may be provided to those not privy to the content.

In an embodiment, a system for redacting one or more portions of a document is provided. The system includes a user interface enabling a user to select, from a first version of the document, a portion of the document, and to specify to redact the selected portion from the document. The system also includes a redaction controller to control, in response to the user specifying to redact the selected portion, a modifying of the selected portion in one or more versions of the document so that, for each of one or more users, when at least one of the one or more versions is displayed, content of the selected portion in the at least one version is not visible to the user and is shown as being redacted.

In an aspect of this embodiment, at least one of the one or more versions is the first version.

In another aspect of this embodiment, the redaction controller is operative to control, in response to the user specifying to redact the selected portion, a modifying of the selected portion in another version of the one or more versions of the document so that, for each of one or more users, when the other version of the document is displayed, content of the selected portion in the other version is visible to the user and is shown as being redacted.

In another aspect of this embodiment, the redaction controller is operative to control encrypting the selected portion in the at least one version of the document.

In yet another aspect of this embodiment, the redaction controller is operative to control removing the selected portion from the at least one version of the document and replacing the selected portion in the at least one version with filler.

In another aspect of this embodiment, the user interface enables the user to specify to redact all occurrences of particular content in the document. The redaction controller is operative, in response to the user specifying to redact all occurrences of the particular content, to modify each portion of the at least one version of the document corresponding to the particular content so that, for each of the one or more users, when the at least one version of the document is displayed, content of each selected portion of the at least one version is not visible to the user and is shown as being redacted.

In another aspect of this embodiment, the user interface is operative to enable the user to select, from the first version of the document, a plurality of redacted portions of the document, and to specify that the plurality of consecutive redacted portions be combined to form a single redacted portion. The redaction controller is operative to combine the redacted portions in each of the one or more versions to produce a single redacted portion in each version.

In another embodiment, a computer program product is provided including, a computer-readable medium. The computer program product also includes computer-readable signals, stored on the computer-readable medium, that define instructions that, as a result of being executed by a computer, control the computer to perform a process of redacting one or more portions of a document. The process includes an act of enabling a user to select, from a first version of the document, a portion of the document, and to specify to redact the selected portion from the document. The process also includes an act of modifying, in response to the user specifying to redact the selected portion, the selected portion in one or more versions of the document so that, for each of one or more users, when at least one of the one or more versions of the document is displayed, content of the selected portion in the at least one version is not visible to the user and is shown as being redacted.

In an aspect of this embodiment, wherein the modifying includes encrypting the selected portion in at least one version of the document.

In another aspect of this embodiment, the modifying includes removing the content of the selected portion from the at least one version of the document.

In another aspect of this embodiment, at least one of the one or more versions is the first version.

In yet another aspect of this embodiment, the user is enabled to specify to redact all occurrences of particular content in the document, and the selected portion is selected as part of the user specifying to redact all occurrences of the particular content. The modifying includes modifying each portion of the at least one version of the document corresponding to the particular content, including the selected portion, so that, for each of the one or more users, when the at least one version of the document is displayed, content of each selected portion of the at least one version is not visible to the user and is shown as being redacted.

In another aspect of this embodiment, the process further includes modifying, in response to the user specifying to redact the selected portion, the selected portion in another version of the one or more versions of the document so that, for each of one or more users, when the other version of the document is displayed, content of the selected portion in the other version is visible to the user and is shown as being redacted.

In another aspect of this embodiment, the process further includes enabling the user to select, from the first version of the document, a plurality of redacted portions of the document, and to specify that the plurality of consecutive redacted portions be combined to form a single redacted portion. The process further includes, in response to the user specifying that the plurality of consecutive redacted portions be combined, combining the redacted portions in each of the one or more versions to produce a single redacted portion in each version.

In another embodiment of the invention, one or more portions of a document are redacted. From a first version of the document, a portion of the document is selected. It is specified to redact the selected portion from the document, in response to which, in one or more versions of the document, the selected portion is modified such that, for each of one or more users, when at least one of the one or more versions of the document is displayed, content of the selected portion in the at least one version is not visible to the user and shown as being redacted.

In an aspect of this embodiment, the at least one of the one or more versions is the first version.

In another aspect of this embodiment, the modifying includes encrypting the selected portion in the at least one version of the document.

In another aspect of this embodiment, the modifying includes removing the content of the selected portion from the at least one version of the document.

In another aspect of this embodiment, the modifying includes, the user is enabled to specify to redact all occurrences of particular content in the document, and the selected portion is selected as part of the user specifying to redact all occurrences of the particular content. The modifying includes modifying each portion in the at least one version of the document corresponding to the particular content, including the selected portion, so that, for each of the one or more users, when the at least one version of the document is displayed, content of each selected portion in the at least one version is not visible to the user and is shown as being redacted.

In yet another aspect of this embodiment, from the first version of the document, a plurality of redacted portions of the document are selected. Is specified that the plurality of consecutive redacted portions be combined to form a single redacted portion, in response to which the redacted portions in each of the one or more versions are combined to produce a single redacted portion in each version.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Although embodiments described herein are described in relation to applications of the Microsoft® Office suite of applications (e.g., those listed below), it should be appreciated that the invention is not so limited. Embodiments of the invention may be implemented using other applications and other types of applications.

The function and advantage of embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
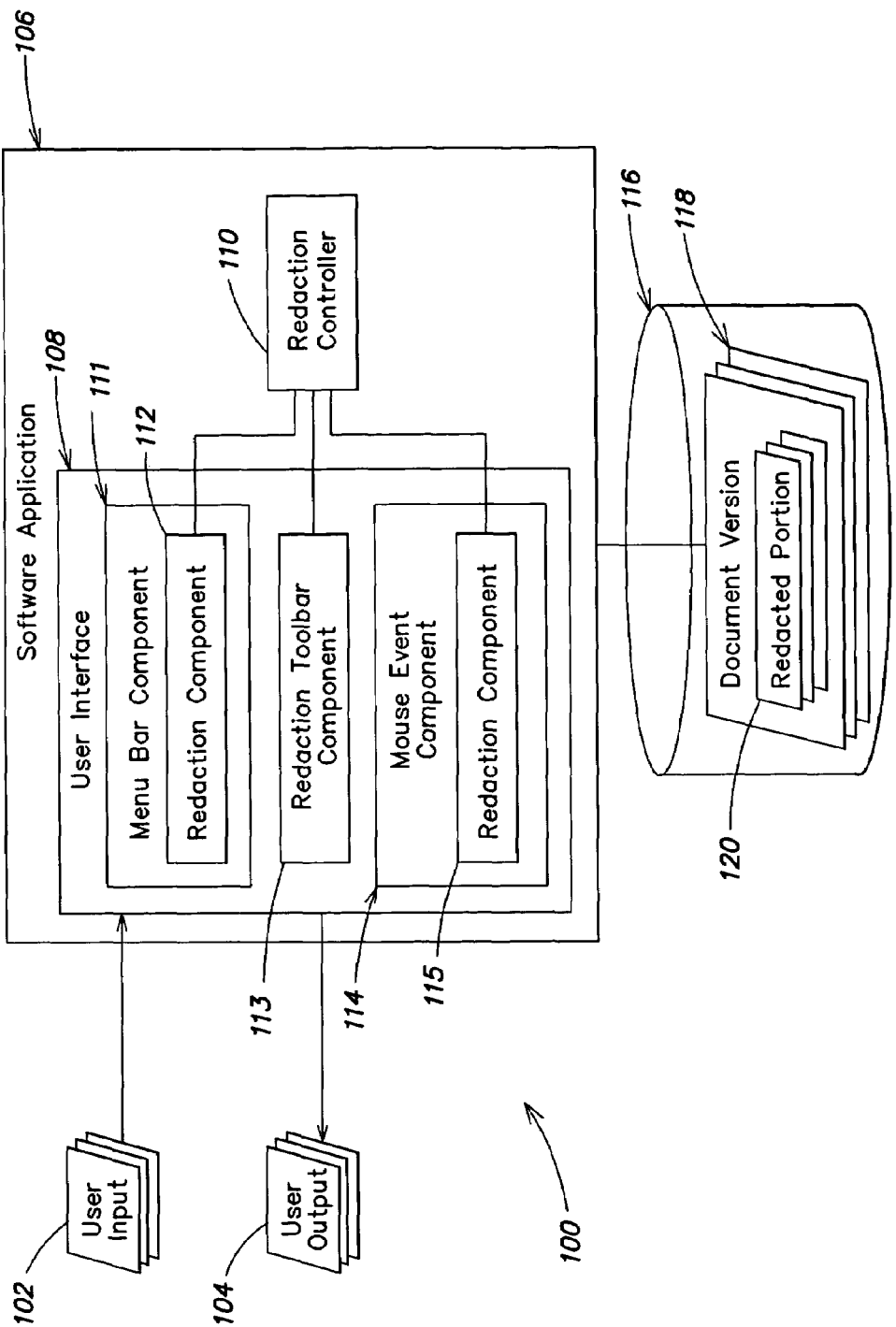
FIG. 1 is a block diagram illustrating an example of a system for performing redaction operations on a document, according to some embodiments of the invention.

FIG. 1 is a block diagram illustrating an example of a system 100 for performing redaction operations on a document. System 100 is merely an illustrative embodiment of a system for performing redaction operations on a document, and is not intended to limit the scope of the invention. Any of numerous other implementations of such a system, for example, variations of system 100, are possible and are intended to fall within the scope of the invention.

System 100 may include one or more software applications 106, one or more data sources 116, other components, or any suitable combination thereof. Software application 106 may be an of a variety of applications and types of applications such as, for example, word-processing applications (e.g., Microsoft® Word), spreadsheet applications (e.g. Microsoft® Excel™), database applications (e.g., Microsoft® Access), presentation applications (e.g., Power-Point®), publishing applications (e.g., Microsoft® Publisher), photo viewing and/or editing applications, document viewing applications (e.g. Adobe® Reader®), email applications, calendar applications, task management applications, other types of applications, and any suitable combination of the foregoing (e.g., Microsoft® Outlook®), another type of application, or any suitable combination of the foregoing.

Software application 106 may include any of the: user interface 108, redaction controller 110, other components, or any suitable combination thereof. As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

The user interface may define how information is visually presented (i.e., displayed) to the user, and defines how the user can navigate the visual presentation (i.e., display) of information and input information in the context of the visual presentation. During execution of the application, the user interface may control the visual presentation of information and enable the user to navigate the visual presentation and enter information in the context of the visual presentation. Types of user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces. As used herein, the visual presentation of information presented by a user interface or GUI is referred to as a "user interface display" or a "GUI display", respectively.

The one or more data sources 116 may include one or more document versions 118, for example, any of the versions of documents described herein (e.g., one or more versions having redacted portions (removed and/or encrypted) and/or one or more documents having one or more portions marked for redaction, but showing the content.

Redaction controller 110 may be configured to control the performance of one or more redaction operations including, but not limited to, any of the redaction operations described herein. Redaction controller 110 may be configured to exchange communications with user interface 108 to implement the one or more redaction operations. Each of the redaction operations described below in relation to redaction menu 206 may be implemented by the user interface 108 (for example, components 112, 113 and 114), the redaction controller 110 and/or a combination thereof. Thus, it should be appreciated that a redaction operation described below as being performed by software application 106 may be performed by redaction controller 110, user interface 108 or a combination thereof.

At least part of controller 110 may be implemented using code embedded within software application 106. In some embodiments, if the software application 106 is configured to enable the addition of add-in code (e.g., if the application is one of the Microsoft® Office suite of applications), at least part of controller 110 may be implemented using add-in code.

User interface 108 may be configured to receive user input (e.g., entries, commands, selections, etc.) 104 and output user output 102 (e.g., to a display device). Menu bar component 111 may be configured to provide a menu bar on a user interface display, the menu bar including one or more menu items. In some embodiments, menu bar component 111 may include redaction component 112 that provides a redaction item on the menu bar that is selectable by a user. Redaction component 112 may be configured to provide a menu of redaction options to a user in response to the user selecting the redaction item. For example, redaction component 112 may be configured to provide redaction menu 206 of user interface display 200 described below in relation to FIG. 2.

Figure 3:
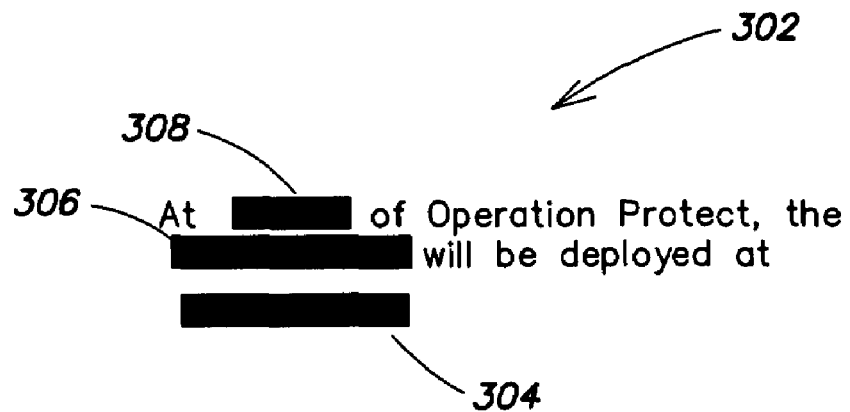
FIG. 3 is a diagram illustrating an example of a sentence including multiple redacted portions, according to some embodiments of the invention.
Figure 4:
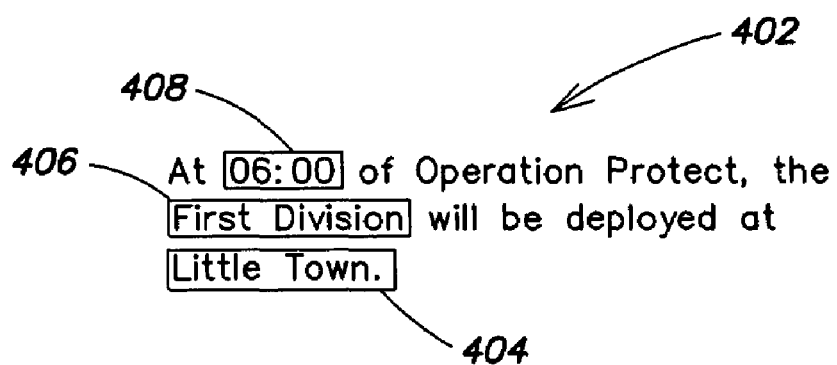
FIG. 4 is a diagram illustrating an example of a sentence having multiple redacted portions marked for redaction, according to some embodiments of the invention.

Embodiments of the invention will now be described with reference to FIGS. 2-4 in combination with FIG. 1.

Figure 2:
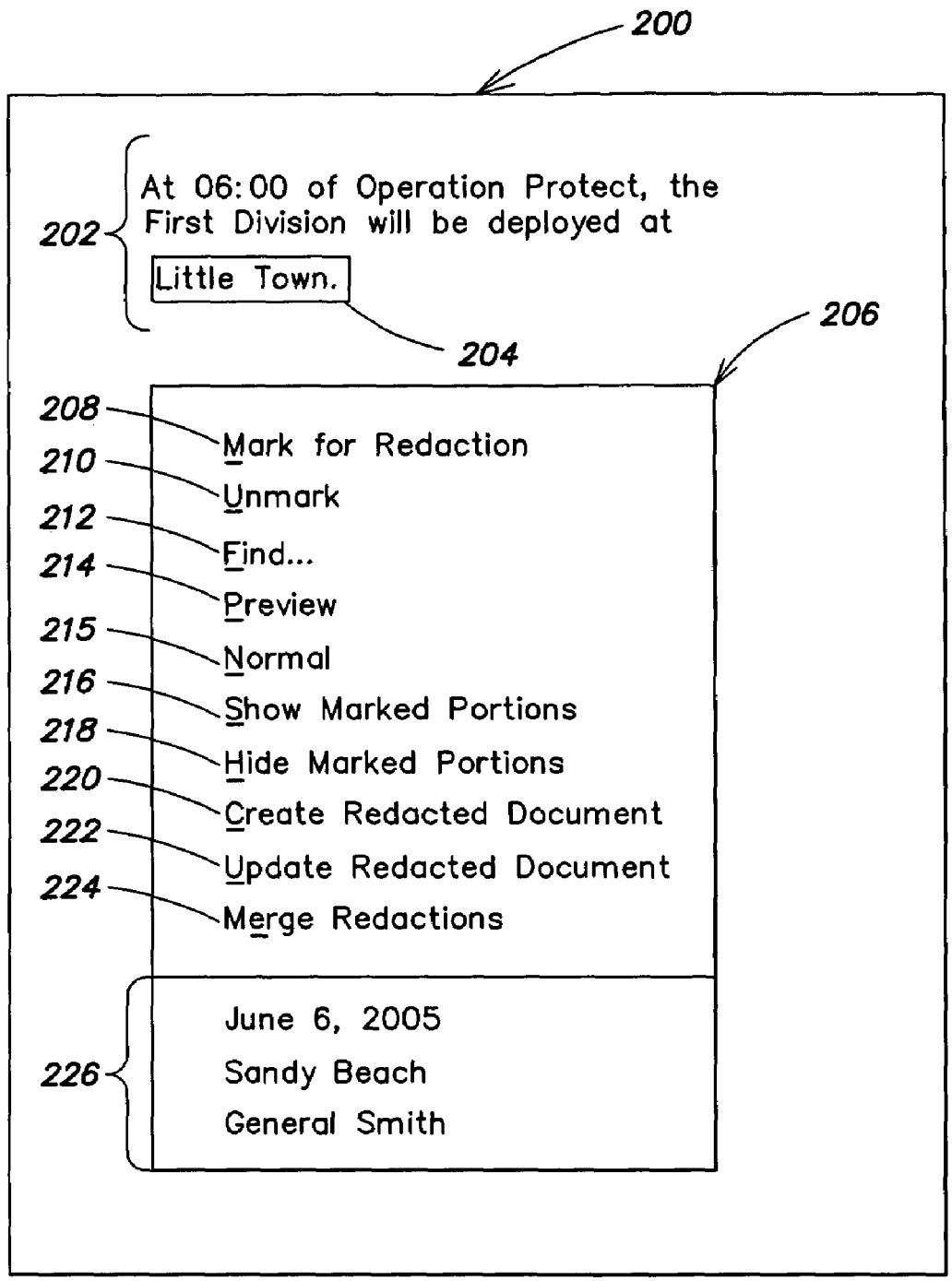
FIG. 2 is a block diagram illustrating an example of a user interface display for performing one or more redaction operations on a document, according to some embodiments of the invention.

FIG. 2 is a block diagram illustrating an example of a user interface display 200 that may be used to perform one or more redaction operations on documents 201. Display 200 is merely an illustrative embodiment of a display that may be used to perform one or more redaction operations on a document, and is not intended to limit the scope of the invention. Any of numerous other implementations of such a display, for example, variations of display 200, are possible and are intended to fall within the scope of the invention. Display 200 may be provided by user interface 100.

Document 201 may include content (i.e., a sentence) 202 including a portion 204. Redaction component 112 of menu bar component 111 may be configured such that, in response to a user selecting the redaction item from the menu bar provided by the menu bar component 111, redaction component 112 controls the display of redaction menu 206 of display 200. As will be discussed in more detail below, redaction menu 206 (or a similar menu) may be provided in response to a user selecting an item from a redaction toolbar provided by redaction toolbar component 113, or in response to a user selecting a redaction item from a mouse event menu provided by mouse event component 114.

Redaction menu 206 may include any of: mark (for redaction) item 208; unmark item 210; find item 212; preview item 214; normal view item 215; show marked portions item 216; hide marked portions item 218; create redacted document item 220; update redacted document item 212; merge redactions item 214; redaction list 226; other components; or any suitable combination of the foregoing. It should be appreciated that the provided redaction menu is not limited to the redaction menu 206 illustrated in FIG. 2. Any of numerous other implementations of a redaction menu, for example, variations of menu 206, are possible and are intended to fall within the scope of the invention. For example, menu 206 may include additional items or less than all of the items displayed in FIG. 2. Further, the order of the items listed in menu 206 may be different, and the text representing each item may be different as well.

Document 201 may have been extracted from data source 116 by software application 106. For example, document 201 may be a document version 118, which may include one or more redacted portions 120.

User interface 108 may be configured to enable a user to select a portion of document 201 using any of a variety of known techniques such as, for example, clicking and dragging a mouse and/or pressing various combinations of a keyboard. User interface 108 may be configured such that, after the user has selected one or more portions of the document, the user is enabled to perform one or more redaction operations on the one or more selections. For example, as discussed above, menu bar component 111 and redaction component 112 may be configured to enable a user to select a redaction item from a menu bar. Further, redaction toolbar component 113 may be configured to provide one or more tools (e.g., represented by icons on the display provided by user interface 108) that are selectable by a user, each tool corresponding to one or more items listed in redaction menu 206.

Mouse event component 114 may be configured to provide a menu of one or more options for a user in response to one or more mouse events such as, for example, a right mouse-click event. Component 114 may include redaction component 115 which provides a user-selectable redaction item on the mouse event menu. Redaction component 115 may be configured such that, if a user selects the redaction item provided by component 515, a redaction menu is presented to the user such as, for example, redaction menu 206. The various functions provided by redaction menu 206 will now be described.

Software application 106 may be configured to enable a user to mark one or more selected portions of a document for redaction, for example, by selecting mark item 208 from redaction menu 206. Toolbar component 113 may provide a tool (e.g., on display 200) corresponding to mark item 208. The user interface 108 may indicate on a user interface display (e.g., display 200) that a portion has been marked for redaction in any of a variety of ways such as, for example, highlighting the selected portion with a certain color or shade of gray, underlining the text in a certain color or shade of gray, etc. For example, as shown in FIG. 4, highlighted portions 404, 406 and 408 of content 402 may result from a user marking these portions.

In some embodiments, if the application 106 is a suitable version of Microsoft® Word, marking a portion of the document may be accomplished by utilizing the Bookmark functionality provided by the application. If application 106 is configured to use a mark-up language such as, for example, an extensible markup language (XML), document portions may be marked using an XML tag. These and other technologies (e.g., formatting technologies) may be used for marking portions of a document, and for managing and/or controlling other redaction operations described herein, including the actual redacting of marked portions.

Software application 106 may be configured to enable a user to unmark one or more marked portions of a document, for example, by selecting unmark item 208 from redaction menu 206. A user may unmark a marked portion to prevent the marked portion from being redacted when the redaction operation is performed. The user interface 108 may be configured such that, in response to a marked portion being unmarked, the indication of the portion being marked is removed from the user interface display. Toolbar component 113 may provide a tool (e.g., on display 200) corresponding to unmark item 210.

Software application 106 may be configured to enable a user to find one or more occurrences of user-specified content (e.g. one or more words), for example, by selecting find item 212. Further, the user may be enabled to specify to redact one or more of the found occurrences, for example, using a dialog window presented in response to selecting item 212. This find-and-redact functionality may operate in an analogous fashion to the find-and-replace feature provided in versions of Microsoft® Word. A find-and-redact dialog window may enable the user to specify to redact all of the occurrences of the particular content or only select occurrences. Toolbar component 113 may provide a tool (e.g., on display 200) corresponding to find item 212.

Software application 106 may be configured to enable a user to preview the appearance of a redacted document having selected portions redacted, for example, by selecting preview item 214. Thus, the user may preview the creation of the redacted document before actually creating it. For example, as shown in FIG. 3, content 302 may be displayed to a user in response to user selecting item 214 after having marked portions 304, 306 and 308 of content 302 for redaction. As illustrated in FIG. 3, a redacted portion of a document (albeit in preview mode) hides the content of the redacted portion, and also visually indicates to the user that the content is hidden. As will be described in more detail below, when the a portion has actually been redacted, the content may be removed from the document or encrypted so that only certain users can see it. In contrast, in preview mode, the content may be temporarily hidden from the user's view, for example, until the document is returned to a "normal" view. Toolbar component 113 may provide a tool (e.g., on display 200) corresponding to preview item 214.

Software application 106 may be configured to enable a user to undo the preview operation (and thus return to a "normal" view of the document), for example, by selecting normal view item 215. Toolbar component 113 may provide a tool (e.g., on display 200) corresponding to normal view item 215.

Software application 106 may be configured to enable a user to hide portions of the document marked for redaction, for example, by selecting hide item 218. This feature may be desirable if a user wants to view the document without the distraction of the visual indications of marked portions. Software application 106 also may be configured to enable a user to undo the hiding of marked portions of the document, for example, by selecting show item 216. Toolbar component 113 may provide tools (e.g., on display 200) corresponding to hide and show items 216 and 218.

Software application 106 may be configured to enable a user to create one or more redacted documents, for example, by selecting create redacted document item 220. Toolbar component 113 may provide a tool (e.g., on display 200) corresponding to create redacted document item 220. As shown in FIG. 3, a redacted document including content 302 may be created, having redacted portions 304, 306 and 308, the redaction visually indicated by being "blacked-out". It should be appreciated that any color, shade of gray or other visually indication may be used to indicate that a portion has been redacted. It may be desirable that the visual indication consume approximately the same amount of space in the document as the content that is redacted. Consuming approximately the same amount of space may indicate to the user the approximate amount of the content removed. For similar reasons, it may be desirable to consume approximately the same amount of space in preview mode.

As opposed to preview mode in the original document, in which the content of the marked portions are only temporarily hidden, the content of the redacted portions in a redacted document may be removed altogether or encrypted. Any of a variety of types of encryption, known or later developed, may be used. User access to the encrypted portions may be managed in any of a variety of ways, for example, by utilizing one or more access rights management systems (e.g., at the machine, network or application level) available to the application 106. For example, if the application 106 is a suitable version of Microsoft® Word, Digital Rights Management (DRM) may be employed. For users for whom access is denied, the redacted portions remains "blacked-out," while for users for whom access is granted, the content is revealed as if it were not redacted.

In some embodiments of the invention, different redacted portions may have different access rights set (e.g., at the time the redacted portion was marked), for example, by employing an access rights management system. Accordingly, as opposed to only a two-tier system where some users are granted access to all redacted portions in the redacted document and some are denied access to all redacted portions, a multiple-tier system may be realized providing a finer level of granularity for access. For example, a redacted document may be configured such that one or more persons have access to all redacted portions document, one or more users have access to less than all of the redacted portions, but are granted access to more redacted portions than one or more other users, etc. Employing such a stratification of access rights in a redacted document may be useful for documents shared by members of an organization such as, for example, the military, a government body or a business entity.

As used herein, a "redacted document" may be considered a "version" of a document from which it was created. Software application 106 may be configured to allow multiple versions of a document to be created showing the redacted portions of a document, for example, by providing a dialog box and/or menu in response to a user selecting create redacted document item 220. In two or more of these versions, the redacted portions may be indicated in different ways, and the content of redacted portions may be removed or encrypted. Further, the document from which other versions are created may be considered a version (e.g., the original version) of the document. In addition or as an alternative to creating a new redacted document, the original version itself may be modified to reflect the one or more redacted portions. Also, the preview view and normal view of the original document, described above, also may be saved as another version of the document.

In some embodiments of the invention, a relationship between versions of a document may be maintained. Software application 106 may be configured to utilize these relationships to propagate changes made to a version of the document (e.g., the original version) to other versions of the document. For example, software application 106 may be configured to enable users to update redacted documents (e.g., with further redactions or changes to redactions made to the original version), for example, by using update redacted document item 222. Toolbar component 113 may provide a tool (e.g., on display 200) corresponding to update redacted document item 222.

In some embodiments of an invention, a user may mark for redaction a portion of a document that contains one or more portions that have already been marked. For example, referring to FIG. 2, a user may mark sentence 202 after portion 204 has already been marked. Application 106 may be configured to automatically merge the two marks, for example, by deleting the mark (e.g., Bookmark or XML tag) for portion 204 and creating a new mark for sentence 202. Similarly, if sentence 202 already includes two or more marked portions, the two or more marks may be cancelled and the new mark for the sentence created.

Similarly, a user may specify to redact a portion (e.g., by marking it and then specifying to redact the document) that contains a portion that has already been redacted. For example, referring to FIG. 3, a user may specify to redact sentence 302 after portion 304 has already been marked. Application 106 may be configured to automatically merge the two redactions, for example, by undoing the redaction of portion 304 and redacting sentence 302. Similarly, if sentence 302 already includes two or more redacted portions, the two or more redactions may be undone and the new mark for the sentence created.

In addition to automatically merging redacted portions as described above, a redaction menu (e.g., menu 206) may include a merge redaction item (e.g., item 224) enabling a user to merge redacted portions. Similarly, a redaction menu (e.g., menu 206) may include a merge marks item enabling a user to merge redacted portions. Toolbar component 113 may provide tools (e.g., on display 200) corresponding to merge redactions item 224 and a merge marks item.

Redactions list 226 may include a list of content that has been marked for redaction, and which may have already been redacted. Each content in the list may correspond to one or marked portions. For example, a user may have marked multiple occurrences of the same content of a document for redaction, and a content listed in list 226 may correspond to all of these occurrences. Software application 106 may enable a user to navigate between marked portions of the document using list 226. For example, a user may select one of the contents from the list. Application 106 may be configured such that, if there is only one marked portion corresponding to the selected content, the focus of the user interface display is changed to the location in the document of the content. Further, if there are multiple marked portions corresponding to selected content, the user may be enabled to select one of the portions and/or navigate between the multiple portions. By default, a portion closest to the beginning of the document or closest following the location of the cursor may be selected. Application 106 may be configured to change the focus of the user interface display to the location in the document of the default portion or the portion selected by the user.

Application 106 also may allow the user to manipulate a portion selected through list 226. For example, the user may be enabled to unmark the selected portion or undo a redaction of the selected portion.

System 100 and components thereof may be implemented using software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on separate, discrete devices. Further, each component may be distributed across multiple devices, and one or more of the devices may be interconnected.

Further, on each of the one or more devices that include one or more components of system 100, each of the components may reside in one or more locations on the system. For example, different portions of the components of system 100 may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100 and components thereof may be implemented using a computer system such as that described below in relation to FIGS. 6 and 7.

Figure 5:
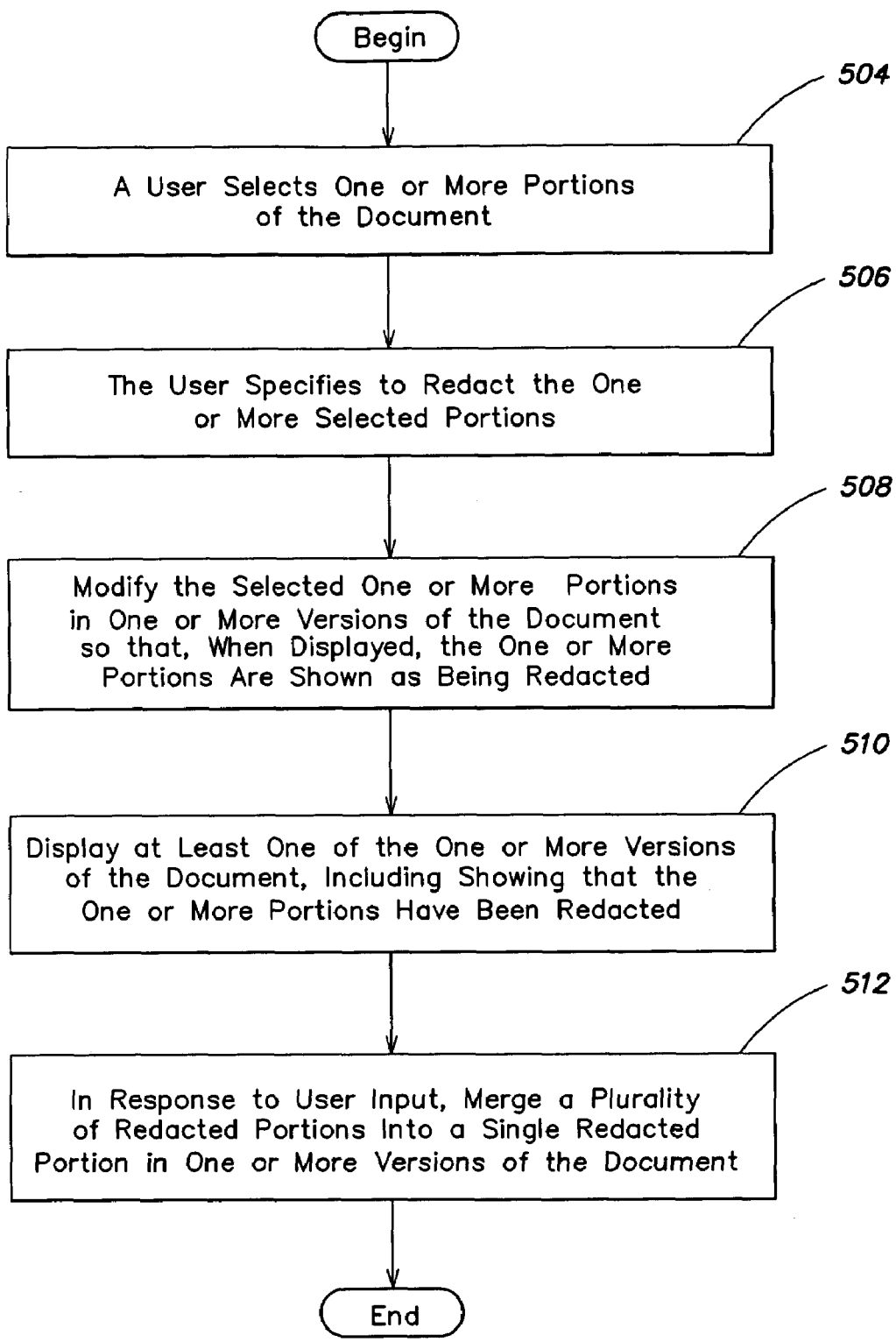
FIG. 5 is a flowchart illustrating an example of a method of performing redacting operations on a document, according to some embodiments of the invention.

FIG. 5 is a flowchart illustrating an example of a method 500 of redacting one or more portions of a document. Method 500 is merely an illustrative embodiment of a method of redacting one or more portions of a document, and is not intended to limit the scope of the invention. Any of numerous other implementations of such a method, for example, variations of method 500, are possible and are intended to fall within the scope of the invention.

In Act 504, a user may select one or more portions of the document. The user may make the selection using any of a variety of know techniques such as, for example, clicking and dragging a mouse and/or pressing various combinations of keys on a keyboard.

In Act 506, the user may specify to redact the one or more selected portions, for example, as described above in relation to FIGS. 1 and 2; that is, by using a redaction menu provided by a menu item of a menu bar or provided by a tool, or in response to a user event such as, for example a right mouse-click. Act 506 may include one or more sub-acts. For example, specifying to redact the one or more selected portions may include: marking the selected portions for redaction; and specifying that a redacted version of the document be created. Two or more (e.g., all) of the selected portions may be marked for redaction at the same time, for example, in response to a single user command following the selection of all of the portions. Further, one or more of the selected portions may be marked for redaction individually, for example, after the selected portion is selected, but before another portion is selected.

In Act 508, in response to Act 506, the selected one or more portions may be modified in one or more versions of the document so that, when displayed, the one or more portions are shown as being redacted, for example, as described above in relation to FIGS. 2-4. As described above, in at least one of the one or more versions, the content of the one or more redacted portions may be removed or encrypted. For example, in response to a user selecting portion 204 and specifying to redact the portion, paragraph 202 may be modified to produce modified paragraph 302 including redacted portion 304 as shown in FIG. 3. Redacted portions 306 and 308 may result from other user-specified redactions.

Further, in at least one version, the content for each portion may be retained, although visually indicated as having been redacted in other versions. For example, in response to a user selecting portion 204 and specifying to redact the portion by selecting menu item 208, paragraph 202 may be modified to produce modified paragraph 402 including highlighted portion 404 shown in FIG. 4. Highlighted portions 406 and 408 may result from other user-specified redactions.

In Act 510, at least one of the one or more versions of the documents may be displayed, including showing that the one or more portions have been redacted. As described above, depending on which version is being displayed and/or the user viewing the version, the content of the one or more portions may be redacted and/or visually indicated as having been redacted.

In Act 512, in response to user input, a plurality of redacted portions may be merged into a single redacted portion. For example, as described above in relation to FIGS. 2-4, the user may specify to redact a portion of a document that includes one or more portions that have already been redacted. The existing redactions for the one or more portions may be undone, and the specified portion redacted. As described above, marked portions of a document similarly may be merged.

Method 500 may include additional acts. Further, the order of the acts performed as part of method 500 is not limited to the order illustrated in FIG. 5, as the acts may be performed in other orders and/or one or more of the acts may be performed in series or in parallel (at least partially).

Method 500, acts thereof and various embodiments and variations of this method and these acts, individually or in combination, may be defined by computer-readable signals tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 500 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 600 or 700 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 6:
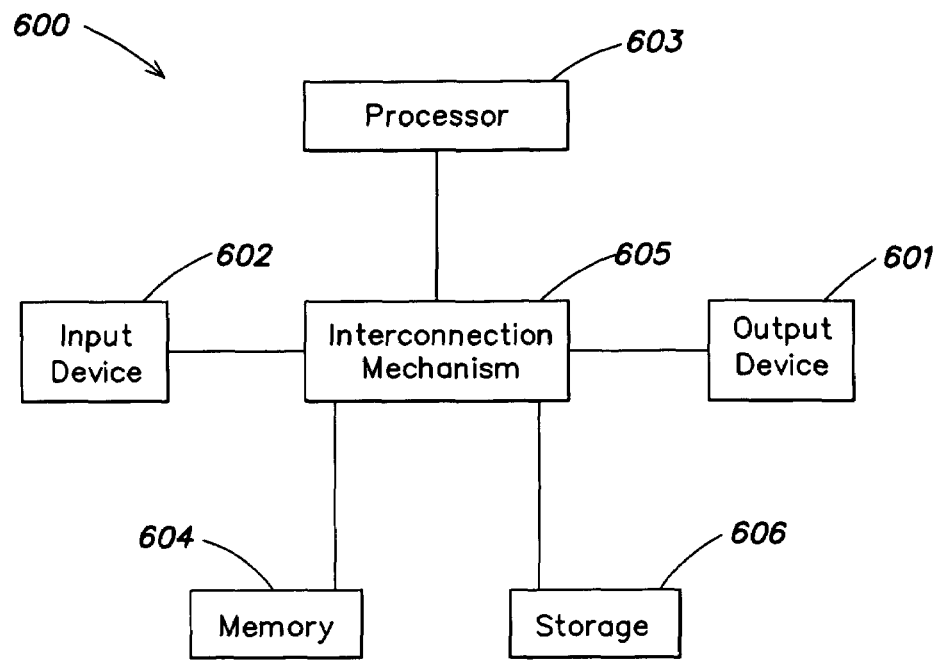
FIG. 6 is a block diagram illustrating an example of a computer system on which some embodiments of the invention may be implemented.
Figure 7:
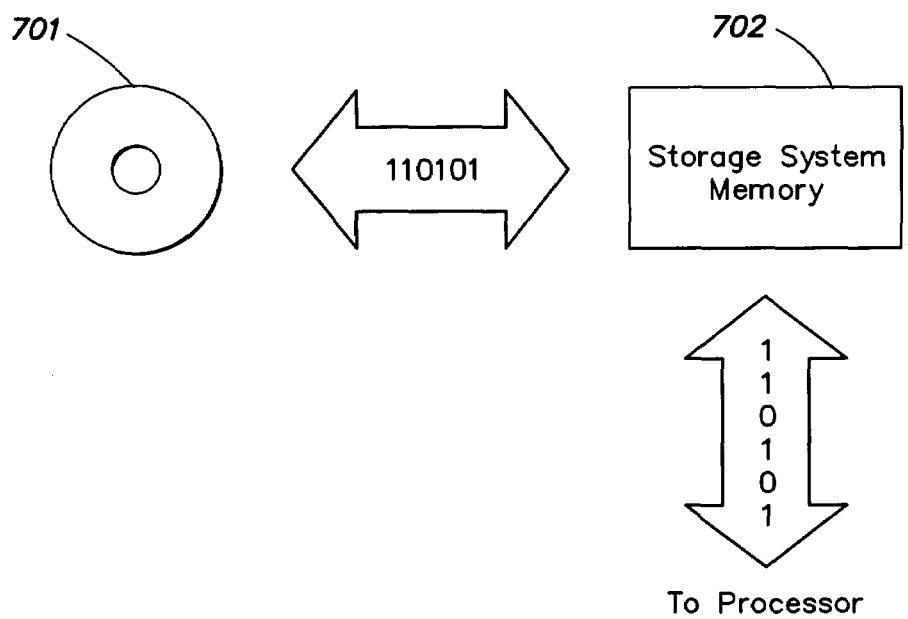
FIG. 7 is a block diagram illustrating an example of a storage system that may be used as part of the computer system to implement some embodiments of the invention.

It should be appreciated that any single component or collection of multiple components of a computer system, for example, the computer system described in relation to FIGS. 6 and 7 that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to convert text to speech and/or edit speech on a portable audio device according to various embodiments of the invention. Further, the software design system may be located on a single computer or may be distributed among a plurality of computers attached by a communications network.

A general-purpose computer system according to one embodiment of the invention is configured to perform convert text to speech and/or edit speech on a portable audio device. It should be appreciated that the system may perform other functions and the invention is not limited to having any particular function or set of functions.

For example, various aspects of the invention may be implemented as specialized software executing in a general-purpose computer system 600 such as that shown in FIG. 6. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism 605.

The storage system 606, shown in greater detail in FIG. 7, typically includes a computer readable and writeable nonvolatile recording medium 701 in which signals are stored that define a program to be executed by the processor or information stored on or in the medium 701 to be processed by the program. The medium may, for example, be a disk or flash memory. Typically, in operation, the processor causes data to be read from the nonvolatile recording medium 701 into another memory 702 that allows for faster access to the information by the processor than does the medium 701. This memory 602 is typically a volatile, random access memory such as a dynamic random access memory (DRAM) or static memory (SRAM). It may be located in storage system 606, as shown, or in memory system 604, not shown. The processor 603 generally manipulates the data within the integrated circuit memory 604, 702 and then copies the data to the medium 701 after processing is completed. A variety of mechanisms are known for managing data movement between the medium 701 and the integrated circuit memory element 604, 702, and the invention is not limited thereto. The invention is not limited to a particular memory system 604 or storage system 606.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components that that shown in FIG. 6.

Computer system 600 may be a general-purpose computer system that is programmable using a high-level computer programming language. Computer system 600 may be also implemented using specially programmed, special purpose hardware. In computer system 600, processor 603 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from Microsoft Corporation, MAC OS System X available from Apple Computer, the Solaris Operating System available from Sun Microsystems, UNIX available from various sources or Linux available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, J# (J-Sharp) or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for redacting one or more portions of a document, the system comprising:
    at least one computer processor programmed to implement:
        a user interface enabling a user to select, from a first version of the document, a portion of the document, and to specify to redact the selected portion from the document;
        a redaction controller to control, in response to the user specifying to redact the selected portions a modifying of the selected portion in a plurality of versions of the document, wherein at least one of the plurality of versions is the first version;
        a save controller to save the first version of the document with the selected portion of the first version of the document being redacted; and
        an access rights controller enabling a user to specify a first group of one or more users with access rights to view content of the selected portion and a second group of one or more users without access rights to view content of the selected portion, so that, for each user in the second group, when at least one of the one or more versions is displayed, content of the selected portion in the at least one version is not visible to the user and is shown as being redacted;
    wherein the user interface is operative to enable the user to select, from the first version of the document, a plurality of redacted portions of the document, and to specify that the plurality of redacted portions be combined to form a single redacted portion, and
    wherein the redaction controller is operative to combine the redacted portions in each of the plurality of versions to product a single redacted portion in each version.

2. The system of claim 1, wherein the redaction controller is operative to control, in response to the user specifying to redact the selected portion, a modifying of the selected portion in another version of the plurality of versions of the document so that, for each user in the second group, when the other version of the document is displayed, content of the selected portion in the other version is visible to the user and is shown as being redacted.

3. The system of claim 1, wherein the redaction controller is operative to control encrypting the selected portion in the plurality of versions of the document.

4. The system of claim 1, wherein the redaction controller is operative to control removing the selected portion from the plurality of versions of the document and replacing the selected portion in the plurality of versions with filler.

5. The system of claim 1, wherein the user interface enables the user to specify to redact all occurrences of particular content in the document,
    wherein the redaction controller is operative, in response to the user specifying to redact all occurrences of the particular content, to modify each portion of the plurality of versions of the document corresponding to the particular content so that, for each user in the second group, when the one of the plurality of versions of the document is displayed, content of each selected portion of the one the plurality of versions is not visible to the user and is shown as being redacted.

6. A computer program product comprising:
    a computer storage medium; and
    computer-readable signals, stored on the computer storage medium, that define instructions that, as a result of being executed by a computer, control the computer to perform a process of redacting one or more portions of a document, the process comprising acts of:
        (A) enabling a user to select, from a first version of the document, a portion of the document, and to specify to redact the selected portion from the document;
        (B) in response to the user specifying to redact the selected portion, modifying the selected portion in a plurality of versions of the document, wherein at least one of the a plurality of versions is the first version;
        (C) saving the first version of the document with the selected portion of the first version of the document being redacted;
        (D) enabling a user to specify a first group of one or more users with access rights to view content of the selected portion and a second group of one or more users without access rights to view content of the selected portion, so that, for each user in the second group, when at least one of the one or more versions of the document is displayed, content of the selected portion in the at least one version is not visible to the user and is shown as being redacted;
        (E) enabling the user to select, from the first version of the document, a plurality of redacted portions of the document, and to specify that the plurality of redacted portions be combined to form a single redacted portion, and
        (F) in response to the user specifying that be plurality of redacted portions be combined, combining the redacted portions in each of the one or more versions to produce a single redacted portion in each version.

7. The computer program product of claim 6, the process further comprising:
    (E) in response to the user specifying to redact the selected portion, modifying the selected portion in another version of the plurality of versions of the document so that, for each of one or more users, when the other version of the document is displayed, content of the selected portion in the other version is visible to the user and is shown as being redacted.

8. The computer program product of claim 6, wherein the Act (B) comprises encrypting the selected portion in the plurality of versions of the document.

9. The computer program product of claim 6, wherein the Act (B) comprises removing the content of the selected portion from the plurality of versions of the document.

10. The computer program product of claim 6, wherein the user is enabled to specify to redact all occurrences of particular content in the document, wherein the selected portion is selected as part of the user specifying to redact all occurrences of the particular content, and wherein the act (B) comprises modifying each portion of the plurality of versions of the document corresponding to the particular content, including the selected portion, so that, for each user in the second group, when plurality of versions of the document is displayed, content of each selected portion of the plurality of versions is not visible to the user and is shown as being redacted.

11. A method of redacting one or more portions of a document, the method comprising computer-implemented acts of:

(A) selecting, from a first version of the document, a portion of the document; and (B) specifying to redact the selected portion from the document, in response to which, in a plurality of versions of the document, the selected portion is modified, wherein at least one of the plurality of versions is the first version;

(C) specifying to save the first version of the document with the selected portion of the first version of the document being redacted;

(D) specifying a first group of one or more users with access rights to view content of the selected portion and a second group of one or more users without access rights to view content of the selected portion, such that, for each user in the second group, when at least one of the one or more versions of the document is displayed, content of the selected portion in the at least one version is not visible to the user and shown as being redacted;

(E) selecting, from the first version of the document, a plurality of redacted portions of the document; and (F) specifying that the plurality of redacted portions be combined to form a single redacted portion, in response to which the redacted portions in each of the plurality of versions are combined to produce a single redacted portion in each version.

12. The method of claim 11, wherein the Act (B) comprises encrypting the selected portion in the plurality of versions of the document.

13. The method of claim 11, wherein the Act (B) comprises removing the content of the selected portion from the plurality of versions of the document.

14. The method of claim 11, wherein the user is enabled to specify to redact all occurrences of particular content in the document, wherein the selected portion is selected as part of the user specifying to redact all occurrences of the particular content, and wherein the act (B) comprises modifying each portion in the plurality of versions of the document corresponding to the particular content, including the selected portion, so that for each user in the second group, when the plurality of versions of the document is displayed, content of each selected portion in the plurality of versions is not visible to the user and is shown as being redacted.

* * * * *